(12) United States Patent
Kang et al.

(10) Patent No.: US 11,320,988 B2
(45) Date of Patent: May 3, 2022

(54) METHOD, APPARATUS AND COMPUTER PROGRAM PRODUCT FOR MANAGING DISK ARRAY

(71) Applicant: EMC IP Holding Company LLC, Hopkinton, MA (US)

(72) Inventors: Jianbin Kang, Beijing (CN); Changyu Feng, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/819,979

(22) Filed: Mar. 16, 2020

(65) Prior Publication Data
US 2020/0348857 A1    Nov. 5, 2020

(30) Foreign Application Priority Data
Apr. 30, 2019    (CN) .......................... 201910360068.3

(51) Int. Cl.
*G06F 3/06*    (2006.01)

(52) U.S. Cl.
CPC .......... *G06F 3/0616* (2013.01); *G06F 3/0631* (2013.01); *G06F 3/0644* (2013.01); *G06F 3/0647* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 9,400,741 B1 | 7/2016 | Bono et al. | |
| 10,007,626 B1 | 6/2018 | Saad et al. | |
| 10,037,157 B1 | 7/2018 | Koli et al. | |
| 10,146,469 B2 | 12/2018 | Polkovnikov et al. | |
| 10,235,055 B1 | 3/2019 | Saad et al. | |
| 10,635,332 B2 | 4/2020 | Wu et al. | |
| 2016/0196075 A1* | 7/2016 | Matsushita ........... | G06F 3/0688 711/103 |

* cited by examiner

*Primary Examiner* — Michael Alsip
(74) *Attorney, Agent, or Firm* — BainwoodHuang

(57) ABSTRACT

Techniques manage a disk array. Such techniques involve determining, from one or more disk arrays constructed based on a plurality of disks, a target disk array to be restriped, the target disk array being associated with disk slices on different disks and including a stripe to be reconstructed, the stripe including extents located in the disk slices; determining, from the disk slices, a first disk slice on which data migration is to be performed, a first extent of the extents being located in the first disk slice; allocating, on the plurality of disks, a second disk slice for storing data from the first disk slice; and reconstructing the stripe by migrating data from the first extent of the first disk slice into the second disk slice. Such techniques significantly reduce the number of input/output operations during stripe reconstruction while avoiding waste of storage space.

24 Claims, 6 Drawing Sheets

METHOD, APPARATUS AND COMPUTER PROGRAM PRODUCT FOR MANAGING DISK ARRAY

CROSS REFERENCE TO RELATED APPLICATION

This application claims priority to Chinese Patent Application No. CN201910360068.3, on file at the China National Intellectual Property Administration (CNIPA), having a filing date of Apr. 30, 2019, and having "METHOD, APPARATUS AND COMPUTER PROGRAM PRODUCT FOR MANAGING DISK ARRAY" as a title, the contents and teachings of which are herein incorporated by reference in their entirety.

FIELD

Embodiments of the present disclosure generally relate to the field of data storage, and more specifically, to a method, an apparatus and a computer program product for managing a disk array.

BACKGROUND

In modern storage systems, multiple disk slices are typically allocated from different storage disks to be combined into a disk array (e.g., a redundant array of independent disks, RAID). When a storage service is provided to a user, logical storage units are typically further created on the disk array for use by the user. When a disk in the disk array is worn to a high degree and is about to fail, or when a new disk is added to the storage system, it is usually necessary to perform a restripe operation to move the data from a disk with a higher wear level to a disk with a lower wear level, thereby balancing the wear level of each disk in the entire disk array.

SUMMARY

Embodiments of the present disclosure provide a method, an apparatus and a computer program product for managing a disk array.

In a first aspect of the present disclosure, there is provided a method for managing a disk array. The method includes: determining, from one or more disk arrays constructed based on a plurality of disks, a target disk array to be restriped, the target disk array being associated with a plurality of disk slices on different disks and including a stripe to be reconstructed, the stripe including a plurality of extents located in the plurality of disk slices; determining, from the plurality of disk slices, a first disk slice on which data migration is to be performed, a first extent of the plurality of extents being located in the first disk slice; allocating, on the plurality of disks, a second disk slice for storing data from the first disk slice; and reconstructing the stripe by migrating data from the first extent of the first disk slice into the second disk slice.

In a second aspect of the present disclosure, there is provided an apparatus for managing a disk array. The apparatus includes at least one processing unit and at least one memory. The at least one memory is coupled to the at least one processing unit and stores instructions for execution by the at least one processing unit. The instructions, when executed by the at least one processing unit, cause the apparatus to perform actions including: determining, from one or more disk arrays constructed based on a plurality of disks, a target disk array to be restriped, the target disk array being associated with a plurality of disk slices on different disks and including a stripe to be reconstructed, the stripe including a plurality of extents located in the plurality of disk slices; determining, from the plurality of disk slices, a first disk slice on which data migration is to be performed, a first extent of the plurality of extents being located in the first disk slice; allocating, on the plurality of disks, a second disk slice for storing data from the first disk slice; and reconstructing the stripe by migrating data from the first extent of the first disk slice into the second disk slice.

In a second aspect of the present disclosure, there is provided a computer program product for managing a disk array. The computer program product is tangibly stored on a non-transitory computer storage medium and includes machine executable instructions. The machine executable instructions, when executed by a device, cause the device to perform any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals generally denote the same components.

In the various figures, the same or corresponding reference numerals indicate the same or corresponding parts.

DETAILED DESCRIPTION

Figure 1:
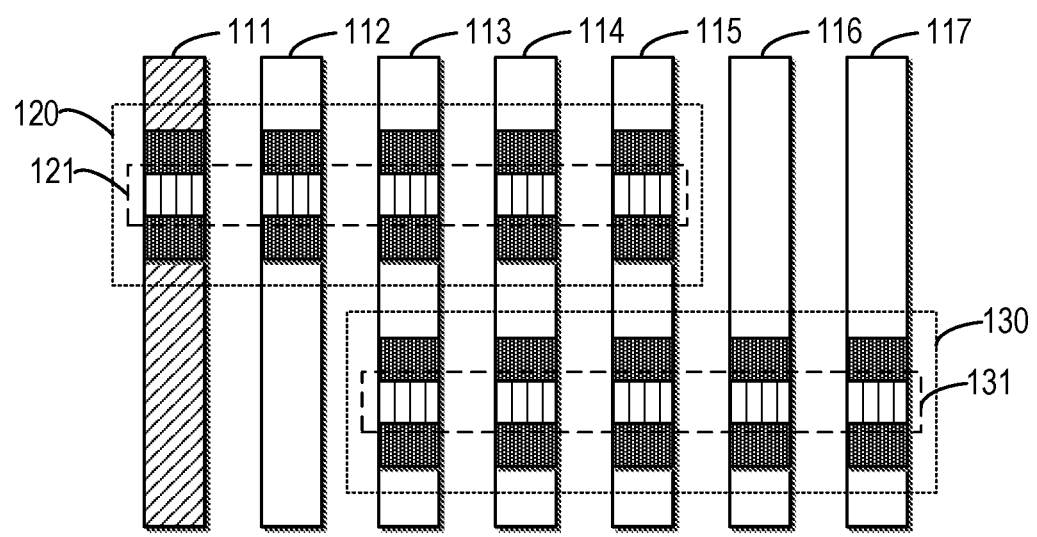
FIG. 1 illustrates a schematic diagram of restripe in accordance with a conventional scheme.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will now be described in more detail with reference to the drawings. Although the preferred embodiments of the present disclosure are illustrated in the drawings, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

As described above, in modern storage systems, multiple disk slices are typically allocated from different storage disks to be combined into a disk array (e.g., RAID). When storage services are to be provided to users, logical storage units (e.g., LUNs) are typically further created on a disk array for use by the users. A disk array typically includes a plurality of stripes, each stripe including a plurality of extents. For example, a RAID stripe typically includes a data extent for storing user data and a parity extent for storing check information. Take RAID 5 with a 4D+1P layout as an example, where each stripe may include 4 data extents (i.e. "4D") and 1 parity extent (i.e. "1P").

When a disk in the disk array is worn to a high degree and is about to fail, or when a new disk is added to the storage system, it is usually necessary to perform a restripe operation to move the data from a disk with a higher wear level to a disk with a lower wear level, thereby balancing the wear level of each disk in the entire disk array.

In the conventional scheme, in order to perform a restripe operation, a new disk array is typically created based on a new set of disk slices, thereby migrating all data from the original disk array to the new disk array.

FIG. 1 illustrates a schematic diagram of restripe in accordance with a conventional scheme. FIG. 1 shows a plurality of disks 111, 112 . . . 117 and a disk array 120 is constructed based on disk slices in the disks 111, 112, 113, 114 and 115. The disk array 120 includes a plurality of stripes, such as a stripe 121 as shown in FIG. 1. For example, when the wear level of a disk 111 exceeds a threshold wear level, restripe may be performed in order to prevent data unavailability or data loss caused by the failure of the disk 111. As shown in FIG. 1, to perform restripe, a new disk array 130 can be constructed based on a new set of disk slices in the disks 112, 113 . . . 117 other than the disk 111. By moving the data in the stripe 121 into a corresponding stripe 131 in the disk array 130, the wear level of each disk in the disk array can be balanced. For example, when the restripe is completed, the disk 111 can be disabled.

As can be seen from the example shown in FIG. 1, in the conventional scheme, in order to implement restripe, a new disk array needs to be created to move data from the original disk array into a new disk array. This may result in a large number of input/output (I/O) operations. At the same time, the creation of the new disk array may also cause mapping information between the disk array and the physical address space, and mapping information between the disk array and the logical address space to be modified. Modifications to these mapping information will also generate a large number of I/O operations.

In some scenarios, such as when storage space in a plurality of disks is almost occupied, a new disk array may fail to be created. Some conventional schemes reserve a certain space in a plurality of disks in advance for creation of a new disk array, which will result in waste of storage space. Because the reserved storage space will never be used to serve any user-desired I/O operation.

Furthermore, when restripe operations need to be performed on a plurality of disk arrays, in order to improve execution efficiency, it is generally desirable to perform these operations in parallel. However, performing restripe by creating a new disk array will limit the number of restripe operations that can be performed in parallel. For example, if it is desired to perform restripe operations on 10 disk arrays at the same time, it will be necessary to create 10 new disk arrays. During the restripe, the original 10 disk arrays will be locked. As a result, the original 10 disk arrays and the newly created 10 disk arrays cannot serve write operations, thereby greatly affecting performance of the storage system.

Embodiments of the present disclosure provide a scheme for managing a disk array to address one or more of the above problems and other potential problems. When performing restripe, the scheme only moves the data in a disk slice on one disk in the disk array to another disk slice allocated on the other disks without creating a new disk array. Therefore, the scheme can avoid a large number of data migration operations and avoid modification of the mapping information between the disk array and the logical address space. In this way, the scheme can significantly reduce the number of I/O operations in the restripe while avoiding wasted storage space at the same time. In addition, the scheme also helps improve the performance of the storage system by increasing the number of restripe operations that can be performed in parallel.

Figure 2:
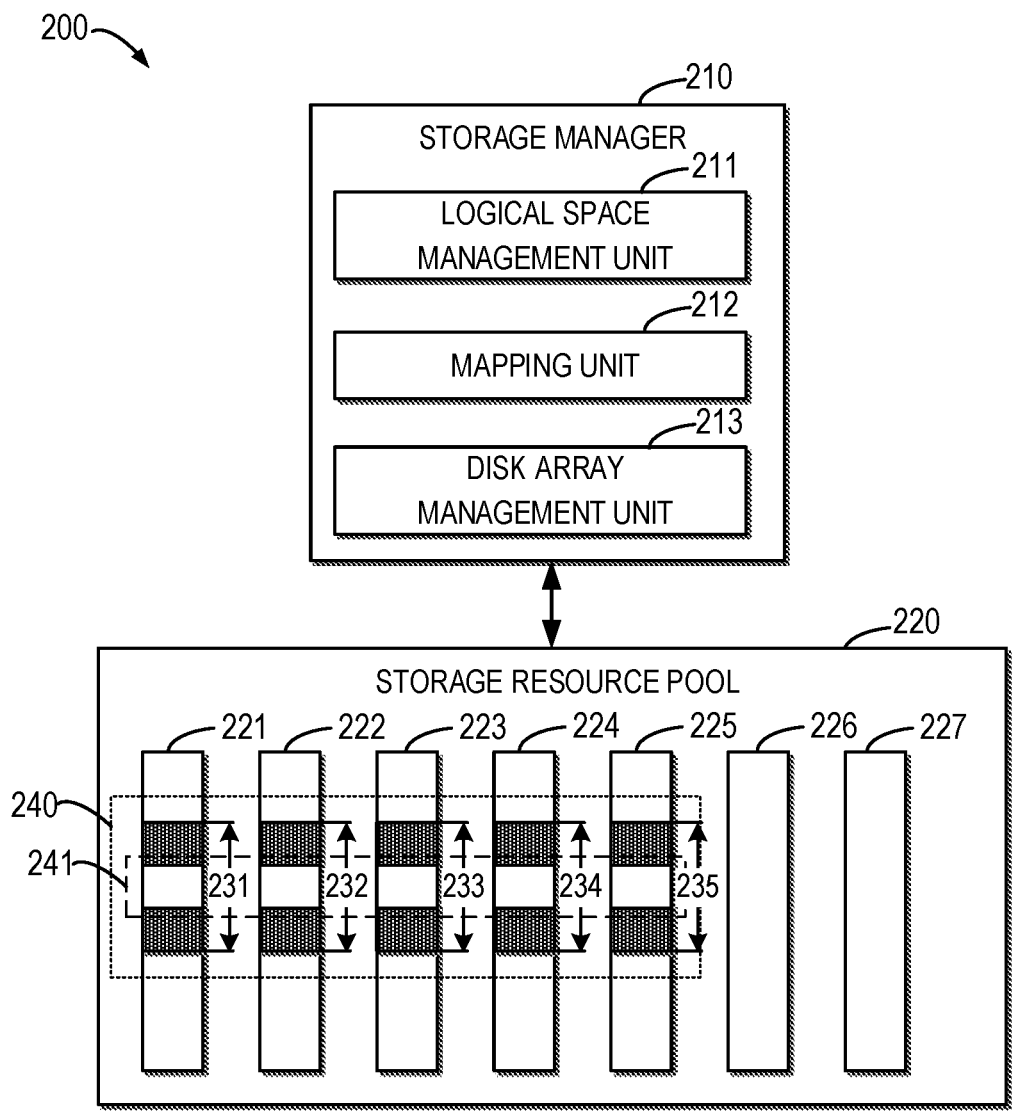
FIG. 2 illustrates a block diagram of an example storage system in which embodiments of the present disclosure can be implemented.

Embodiments of the present disclosure will be described in detail below with reference to the figures. FIG. 2 illustrates a block diagram of an example storage system 200 in which embodiments of the present disclosure can be implemented. It should be understood that the structure of the storage system 200 is described for illustrative purposes only, without suggesting any limitation to the scope of the disclosure. For example, embodiments of the present disclosure may also be applicable to a system or an environment that is different than the storage system 200.

As shown in FIG. 2, the system 200 may include a storage manager 210 and a storage resource pool 220 including a plurality of disks 221, 222 . . . 227. Although only seven disks are shown in FIG. 1, it should be understood that this is for illustrative purposes only and not intended to suggest any limitation to the scope of the disclosure. In some embodiments, the storage resource pool 220 can include more or fewer disks. The "disk" as used herein may refer to any non-volatile storage medium currently known or to be developed in future, such as a magnetic disk, an optical disk, or a solid state disk (SSD) and so on.

The storage manager 210 may be configured to manage the storage resource pool 220. As shown in FIG. 2, the storage manager 210 may include, for example, a logical space management unit 211, a mapping unit 212, and a disk array management unit 213. It should be understood that the structure of the storage manager 210 is shown in FIG. 2 for the purpose of illustration only, without suggesting any limitation to the scope of the present disclosure. In some embodiments, the storage manager 210 may be implemented in a different structure, for example, which may include units not shown in FIG. 2 or omit some of the units shown in FIG. 2.

In some embodiments, the disk array management unit 213 may divide each disk of the storage resource pools 220 into a plurality of fixed size disk slices (e.g., each disk slice may be 4 GB in size). The disk array management unit 213 may organize a plurality of disk slices on different disks into a disk array. For example, as shown in FIG. 2, the disk array management unit 213 may organize a disk slice 231 on the disk 221, a disk slice 232 on the disk 222, a disk slice 233 on the disk 223, a disk slice 234 on the disk 224, and a disk slices 235 on the disk 225 into a disk array 240 (e.g., RAID 5 with a 4D+1P layout). The disk array 240 can include one or more stripes, such as a stripe 241 as shown in FIG. 2. The size of each stripe can be of a fixed size, such as 2 MB. In some embodiments, the disk array management unit 213 may maintain mapping information (also referred to as metadata of the disk array 240) between the disk array 240 and the plurality of disks 221, 222 . . . 227. For example, the metadata maintained by the disk array management unit 213 may indicate the disk array 240 is associated with the disk slice 231 on the disk 221, the disk slice 232 on the disk 222, the disk slice 233 on the disk 223, the disk slice 234 on the disk 224 and disk slice 235 on disk 225.

In some embodiments, the mapping unit 212 may be configured to implement mapping from a physical address space to a logical address space. For example, the mapping unit 212 may map one or more disk arrays (e.g., the disk array 240) built on the plurality of disks 221, 222 . . . 227 to a logical address space to be exposed to a logical space management unit 211. In some embodiments, the logical space management unit 211 can use the logical address space exposed by the mapping unit 212. For example, the logical space management unit 211 can create a logical storage unit (e.g., a LUN) on a logical address space for use by a user or an upper application. Further, the mapping unit 212 may maintain mapping information (also referred to as metadata) between the disk array and the logical address space. For example, the metadata maintained by the mapping unit 212 may indicate which logical storage units the disk array 240 is associated with, and which stripes in the disk array 240 are used by the user, and the like.

Figure 3:
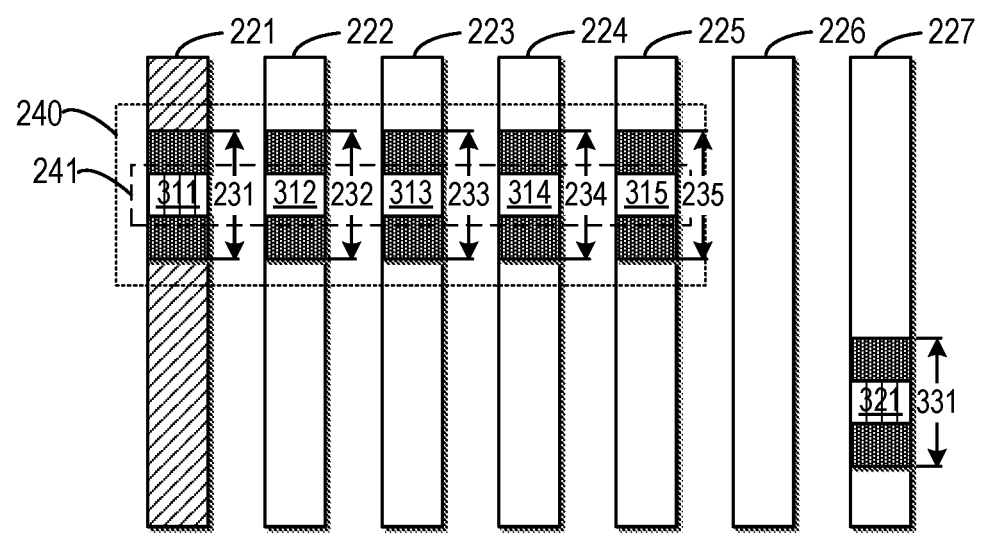
FIG. 3 illustrates a schematic diagram of restripe in accordance with embodiments of the present disclosure.

FIG. 3 illustrates a schematic diagram of restripe in accordance with embodiments of the present disclosure. The plurality of disks 221, 222, . . . 227 as shown in FIG. 2 are shown in FIG. 3 along with the disk array 240 constructed based on the disk slice 231 on the disk 221, the disk slice 232 on the disk 222, the disk slice 233 on the disk 223, the disk slice 234 on the disk 224 and disk slice 235 on disk 225.

In some embodiments, for example, when the wear level of the disk 221 exceeds a threshold wear level or when the I/O load level of the disk 221 exceeds a threshold I/O load level, restripe may be performed in order to prevent data unavailablility or data loss caused by the failure of the disk 221. As shown in FIG. 3, the disk array 240 includes, for example, a stripe 241 used by a user. The stripe 241 includes an extent 311 from the disk slice 231, an extent 312 from the disk slice 232, and an extent 313 from the disk slice 233, an extent 314 from the disk slice 234 and an extent 315 from the disk slice 235.

In some embodiments, in order to perform restripe operation, new disk slices may be allocated from the disks 112, 113, . . . , 117 other than disk 111 for storing data from the disk slice 231 (also referred to herein as "first slice") of the disk 111. As shown in FIG. 3, a new disk slice 331 (also referred to herein as "second disk slice") is allocated, for example, on the disk 227 for storing data from the first disk slice 231. For the stripe 241 used by the user in the disk array 240, the data in the extent 311 (i.e., the extent located in the first disk slice 231) in the stripe 241 may be moved to a corresponding position 321 in the second disk slice 331 to implement reconstruction of the stripe 241.

In some embodiments, when there are multiple stripes used by a user in the disk array 240, the above operations may be performed for each of the plurality of stripes, thereby completing restripe for the disk array 240. In some embodiments, when the restripe for the disk array 240 is completed, the storage space occupied by the disk slice 231 in the disk 221 can be released. Additionally or alternatively, the disk 221 may also be disabled or removed from the storage resource pool 220.

Figure 4:
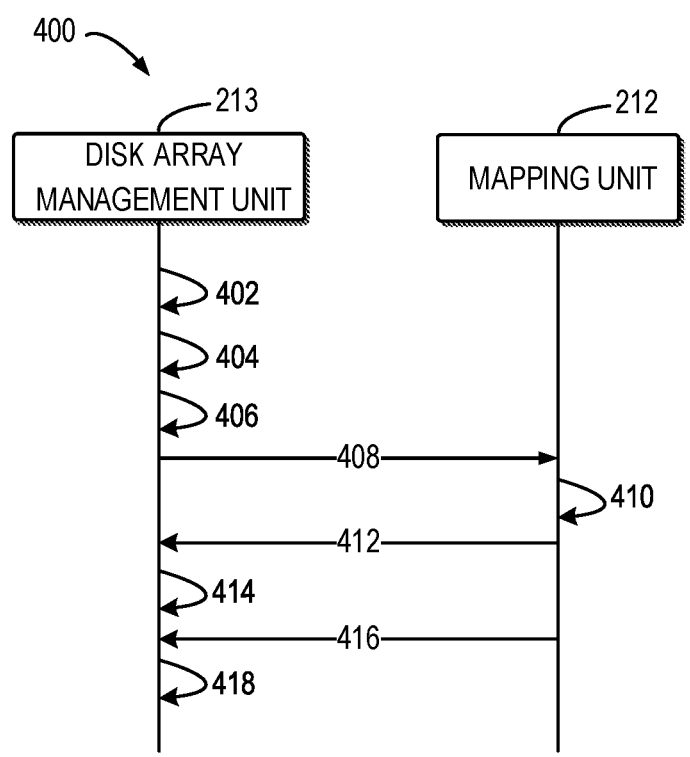
FIG. 4 illustrates a schematic diagram of an example process in accordance with embodiments of the present disclosure.

FIG. 4 shows a schematic diagram of an example process 400 in accordance with embodiments of the present disclosure. For example, the process 400 involves the disk array management unit 213 and the mapping unit 212 as shown in FIG. 2. It should be understood that the process 400 may also include additional acts not shown and/or may omit the illustrated acts, and the scope of the present disclosure is not limited in this respect. The process 400 will be described in detail below in conjunction with FIG. 3.

As shown in FIG. 4, the disk array management unit 213 determines 402, from one or more disk arrays constructed based on the plurality of disks 221, 222 . . . 227, a target disk array to be restriped.

In some embodiments, the disk array management unit 213 may select a disk (e.g., the disk 221) whose wear level exceeds a threshold wear level from among the plurality of disks 221, 222, . . . 227, and select a disk array (e.g., disk array 240) constructed based on the disk as the target disk array. Alternatively, in some embodiments, the storage manager 210 may select a disk (e.g., disk 221) whose I/O load level exceeds a threshold I/O load level from among the multiple disks 221, 222, . . . 227, and select a disk array (e.g., the disk array 240) constructed based on the disk as the target disk array. Alternatively, in some embodiments, when a new disk is added to the storage resource pool 220, the storage manager 210 may select a disk (e.g., the disk 221) with the highest wear level or with the maximum I/O load level from among the disks (e.g., the disks 221, 222, 223, 224 and 225) that have been used to construct the disk array, and select a disk array (e.g., the disk array 240) constructed based on the disk as the target disk array.

In some embodiments, the target disk array can be associated with a plurality of disk slices on different disks. For example, as shown in FIG. 2, the target disk array 240 may be associated with the disk slice 231 on the disk 221, the disk slice 232 on the disk 222, the disk slice 233 on disk 223, the disk slice 234 on the disk 224, and the disk slice 235 on the disk 225. Additionally, the target disk array 240 may include one or more stripes, such as the stripe 241 as shown in FIG. 2. The stripe 241, for example, may include the extent 311 from the disk slice 231, the extent 312 from the disk slice 232, the extent 313 from the disk slice 233, the extent 314 from the disk slice 234, and the extent 315 from the disk slice 235.

As shown in FIG. 4, the disk array management unit 213 determines 404, from the plurality of the disk slices 231, 232, 233, 234, and 235, a first disk slice on which data migration is to be performed.

In some embodiments, for example, the disk array management unit 213 may determine the disk slice 231 on the disk 221 (i.e., the disk with a higher wear level or higher I/O load level) among the plurality of the disk slices 231, 232, 233, 234, and 235 as the first disk slice on which data migration is to be performed.

As shown in FIG. 4, the disk array management unit 213 allocates 406 a second disk slice on the plurality of the disks 221, 222 . . . 227, to store data from the first disk slice 231.

In some embodiments, the disk array management unit 213 may select, from the plurality of the disks 221, 222 . . . 227, another disk (also referred to herein as "the second disk") different from the disk 221 (also referred to herein as "the first disk"), such as, the disk 227. Additionally or alternatively, in some embodiments, the selected second disk may have a lower wear level than the first disk. Additionally or alternatively, in some embodiments, the selected second disk may have a lower I/O load level than the first disk. In some embodiments, the disk array management unit 213 may allocate a second disk slice on the selected second disk 227, such as a disk slice 331, for storing data from the first disk slice 231.

In some embodiments, the disk array management unit 213 may obtain metadata of the disk array 240, for example, which indicates that the disk array 240 is associated with the plurality of the disk slices 231, 232, 233, 234, and 235. In response to the second disk slice 331 being allocated, the disk array management unit 213 may modify the metadata to indicate that the disk array 240 is associated with the allocated disk slice 331.

As shown in FIG. 4, in response to the second disk slice 331 being allocated, the disk array management unit 213 sends 408 a message to the mapping unit 212 to notify the mapping unit 212 to perform restripe on the disk array 240.

In response to receiving the message from the disk array management unit 213, the mapping unit 212 may determine a stripe 410 used by the user from among one or more stripes included in the disk array 240. In some embodiments, the mapping unit 212 may determine, based on the metadata it maintains, which stripes in the disk array 240 are used by the user. It is assumed here that the determined stripe is the stripe 241. The mapping unit 212 may send 412 a command to the disk array management unit 212 to instruct the disk array management unit 212 to migrate the data located in the first disk slice 231 of the stripe 241 to a corresponding position in the second disk slice 331.

In response to receiving the command from the mapping unit 212, the disk array management unit 212 may migrate 414 the data in the extent 311 of the stripe 241 located in the first disk slice 231 to the corresponding position in the second disk slice 331 to complete reconstruction of the stripe 241. When there are a plurality of stripes used by the user in the disk array 240, the acts 410-414 can be performed multiple times until reconstruction of all the stripes used by the user is completed.

As shown in FIG. 4, after completion of restripe of all the stripes used by the user in the disk array 240, the mapping unit 212 may send 416 a message to the disk array management unit 213 to notify the disk array management unit 213 of completion of the restripe of the disk array 240.

In response to receiving the message from the mapping unit 212 indicating completion of the restripe of the disk array 240, the disk array management unit 213 may release 418 storage space occupied by the first disk slice 231. Additionally or alternatively, the disk array management unit 213 may further modify the metadata of the disk array 240 to indicate that the disk array 240 is disassociated from the first disk slice 231.

As can be seen from the above description, during the restripe operation, embodiments of the present disclosure do not involve the creation of a new disk array, so the mapping unit does not need to maintain its metadata for each stripe involved in restripe (i.e., mapping information between the stripe and the logical address space). The disk array management unit only needs to modify the metadata of the disk array (i.e., the mapping information between the disk array and the physical disk) twice: one time occurs when the second disk slice is allocated, and the other time occurs when restripe is completed. (i.e., when the first disk slice is disassociated from the disk array). During the restripe operation, the mapping unit does not need to read any data, and the disk array management unit is responsible for migrating data from the first slice to the second slice. The mapping unit does not need to lock the disk array, that is, the disk array can still serve user I/O operations during the restripe of the disk array.

Table 1 shows a comparison between the number of I/O operations (referred to as "number A" in Table 1) involved in the restripe process according to the conventional scheme and the number of I/O operations (referred to as "number B" in Table 1) involved in the restripe process according to the embodiment of the present disclosure.

TABLE 1

| Type | 1 + 1 Mirror | 1 + 2 Mirror | 4D + 1P RAID5 | 8D + 1P RAID5 | 16D + 1P RAID5 | 4D + 2P RAID6 | 8D + 2P RAID6 | 16D + 2P RAID6 |
|---|---|---|---|---|---|---|---|---|
| Number A | >=5 | >=6 | >=11 | >=19 | >=35 | >=12 | >=20 | >=36 |
| Number B | 2 | 2 | 2 | 2 | 2 | 2 | 2 | 2 |
| B/A | 40% | 33% | 18% | 11% | 5.7% | 17% | 10% | 5.6% |

As shown in Table 1, in the conventional scheme, the number of I/O operations involved in the restripe process is 5-36. According to embodiments of the represent disclosure, the number of I/O operations involved in the restripe process is always 2 (1 read and 1 write). As can be seen, embodiments of the present disclosure can significantly reduce the number of I/O operations involved in the restripe process.

Figure 5:
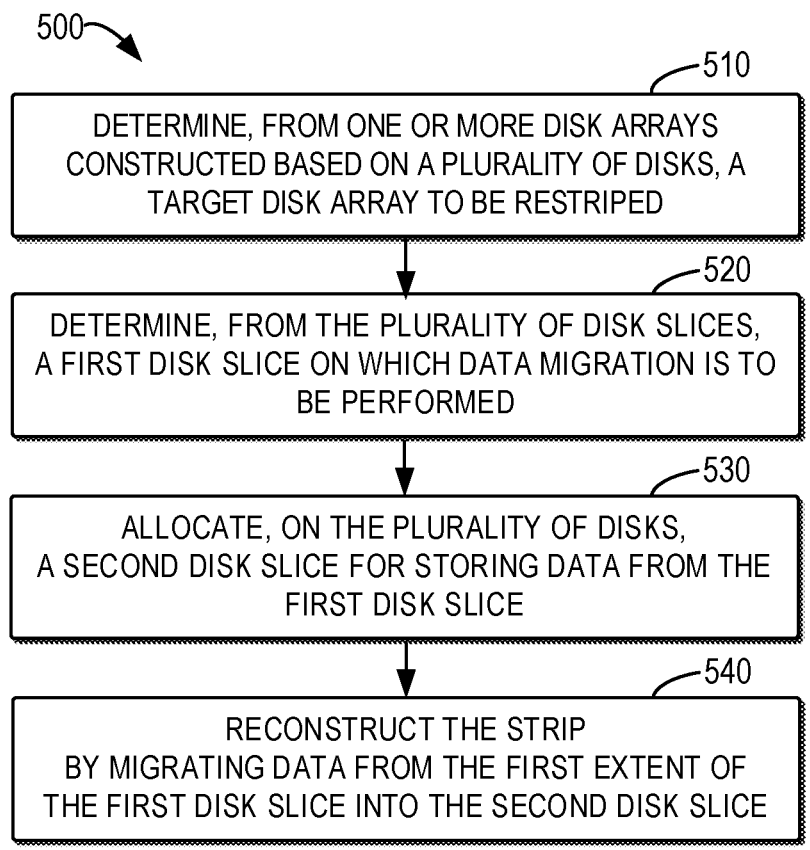
FIG. 5 illustrates a flow chart of an example method in accordance with embodiments of the present disclosure.

FIG. 5 illustrates a flow chart of an example method 500 in accordance with embodiments of the present disclosure. For example, method 500 can be performed by the storage manager 210 as shown in FIG. 2. It should be understood that the method 500 may include additional acts not shown and/or may omit the illustrated acts, and the scope of the present disclosure is not limited in this respect.

At block 510, the storage manager 210 determines, from one or more disk arrays constructed based on a plurality of disks, a target disk array to be restriped, the target disk array being associated with a plurality of disk slices on different disks and including a stripe to be reconstructed, the stripe including a plurality of extents located in the plurality of disk slices.

At block 520, the storage manager 210 determines, from the plurality of disk slices, a first disk slice on which data migration is to be performed, a first extent of the plurality of extents being located in the first disk slice.

In some embodiments, the storage manager 210 selects, from the plurality of disks, a disk with a wear level exceeding a threshold wear level and selects, from the one or more disk arrays, a disk array constructed based on at least the disk as the target disk array.

In some embodiments, the storage manager 210 selects, from the plurality of disks, a disk with an input/output load level exceeding a threshold load levels and selects, from the one or more disk arrays, a disk array constructed based on at least the disk as the target disk array.

In some embodiments, the storage manager 210 determines, from the plurality of disk slices, a disk slice located on the disk as the first disk slice.

At block 530, the storage manager 210 allocates, on the plurality of disks, a second disk slice for storing data from the first disk slice.

In some embodiments, the first disk slice is located on a first disk of the plurality of disks. The storage manager 210 selects, from the plurality of disks, a second disk different from the first disk and allocates the second disk slice on the second disk.

In some embodiments, a first disk has a first wear level. The storage manager 210 selects, from the plurality of disks, the second disk with a second wear level below the first wear level.

In some embodiments, a first disk has a first input/output load level. The storage manager 210 selects, from the plurality of disks, a second disk with a second input/output load level below the first input/output load level.

At block 540, the storage manager 210 reconstructs the stripe by migrating data from the first extent of the first disk slice into the second disk slice.

In some embodiments, the storage manager 210 determines a first location of a first extent in a first disk slice. The storage manager 210 determines, based on the first location, a second location in the second disk slice for storing data from the first extent. The storage manager 210 migrates the data from the first location in the first disk slice to the second location in the second disk slice.

In some embodiments, the storage manager 210 obtains metadata of the target disk array and the metadata indicates that the target disk array is associated with the plurality of disk slices. In some embodiments, in response to a second disk slice being allocated, the storage manager 210 updates the metadata to indicate that the target disk array is associated with the second disk slice. In some embodiments, in response to completion of the reconstruction of the stripe, the storage manager 210 updates the metadata to indicate that the target disk array is disassociated from the first disk slice.

Figure 6:
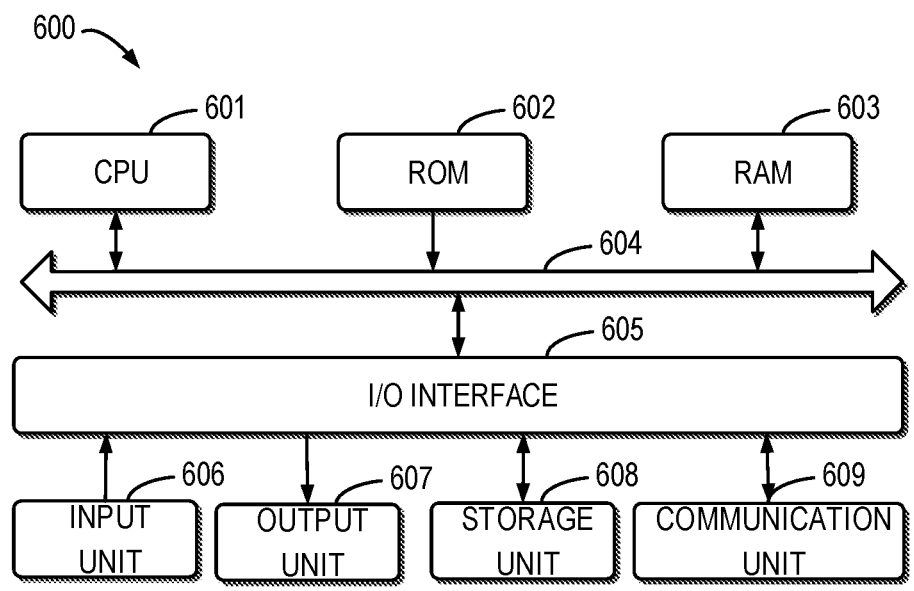
FIG. 6 shows a schematic block diagram of an example device that can be used to implement embodiments of the present disclosure.

FIG. 6 is a block diagram illustrating a device 600 adapted to implement embodiments of the present disclosure. For example, the storage manager 210 may be implemented by the device 600. As shown in FIG. 6, the device 600 includes a central processing unit (CPU) 601 that may perform various appropriate actions and processing based on computer program instructions stored in a read-only memory (ROM) 602 or computer program instructions loaded from a storage extent 608 to a random access memory (RAM) 603. In the RAM 603, there further store various programs and data needed for operations of the device 600. The CPU 601, ROM 602 and RAM 603 are connected to each other via a bus 604. An input/output (I/O) interface 605 is also connected to the bus 604.

The following components in the device 600 are connected to the I/O interface 605: an input 606 such as a keyboard, a mouse and the like; an output unit 607 including various kinds of displays and a loudspeaker, etc.; a memory unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the method 400 or 500, may be executed by the processing unit 601. For example, in some embodiments, the method 400 or 500 may be implemented as a computer software program that is tangibly embodied on a machine readable medium, e.g., the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more steps of the method 400 or 500 as described above may be executed.

The present disclosure may be a method, device, system, and/or computer program product. The computer program product may include a computer readable storage medium having computer readable program instructions thereon for carrying out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means (e.g., specialized circuitry) for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a disk array, comprising:
   determining, from one or more disk arrays constructed based on a plurality of disks, a target disk array to be restriped, the target disk array being associated with a plurality of disk slices on different individual disks and including a stripe to be reconstructed, the stripe comprising a plurality of extents located in the plurality of disk slices, wherein each disk slice is located completely within a single one of the plurality of disks, and wherein each extent is located completely within a single one of the plurality of disk slices;
   determining, from the plurality of disk slices, a first disk slice on which data migration is to be performed, a first extent of the plurality of extents being located in the first disk slice;
   allocating, on the plurality of disks, a second disk slice for storing data from the first disk slice; and
   reconstructing the stripe by migrating data only from the first extent of the first disk slice into a corresponding position within the second disk slice, wherein migrating data from the first extent of the first disk slice into the corresponding position within the second disk slice completely reconstructs the stripe.

2. The method of claim 1, wherein determining the target disk array comprises:
   selecting, from the plurality of disks, a disk with a wear level exceeding a threshold wear level; and
   selecting, from the one or more disk arrays, a disk array constructed based on at least the disk as the target disk array.

3. The method of claim 1, wherein determining the target disk array comprises:
   selecting, from the plurality of disks, a disk with an input/output load level exceeding a threshold load levels; and selecting, from the one or more disk arrays, a disk array constructed based on at least the disk as the target disk array.

4. The method of claim 2, wherein determining the first disk slice comprises:
determining, from the plurality of disk slices, a disk slice located on the disk as the first disk slice.

5. The method of claim 1, wherein the first disk slice is located on a first disk of the plurality of disks, and allocating the second disk slice comprises:
selecting, from the plurality of disks, a second disk different from the first disk; and
allocating the second disk slice on the second disk.

6. The method of claim 5, wherein the first disk has a first wear level, and selecting the second disk comprises:
selecting, from the plurality of disks, the second disk with a second wear level below the first wear level.

7. The method of claim 5, wherein the first disk has a first input/output load level, and selecting the second disk comprises:
selecting, from the plurality of disks, a second disk with a second input/output load level below the first input/output load level.

8. The method of claim 1, wherein migrating data from the first extent of the first disk slice into the corresponding position within the second disk slice comprises:
determining a first location of a first extent in the first disk slice;
determining, based on the first location, a second location in the second disk slice for storing data from the first extent; and
migrating the data from the first location in the first disk slice to the second location in the second disk slice.

9. The method of claim 1, further comprising:
obtaining metadata of the target disk array, the metadata indicating that the target disk array is associated with the plurality of disk slices; and
in response to the second disk slice being allocated, updating the metadata to indicate that the target disk array is associated with the second disk slice.

10. The method of claim 9, further comprising:
in response to completion of the reconstruction of the stripe, updating the metadata to indicate that the target disk array is disassociated from the first disk slice.

11. An apparatus for managing a disk array, comprising:
at least one processing unit; and
at least one memory coupled to the at least one processing unit and storing instructions for execution by the at least one processing unit, the instructions, when executed by the at least one processing unit, causing the apparatus to perform actions comprising:
determining, from one or more disk arrays constructed based on a plurality of disks, a target disk array to be restriped, the target disk array being associated with a plurality of disk slices on different individual disks and including a stripe to be reconstructed, the stripe comprising a plurality of extents located in the plurality of disk slices, wherein each disk slice is located completely within a single one of the plurality of disks, and wherein each extent is located completely within a single one of the plurality of disk slices;
determining, from the plurality of disk slices, a first disk slice on which data migration is to be performed, a first extent of the plurality of extents being located in the first disk slice;
allocating, on the plurality of disks, a second disk slice for storing data from the first disk slice; and
reconstructing the stripe by migrating data only from the first extent of the first disk slice into a corresponding position within the second disk slice, wherein migrating data from the first extent of the first disk slice into the corresponding position within the second disk slice completely reconstructs the stripe.

12. The apparatus of claim 11, wherein determining the target disk array comprises:
selecting, from the plurality of disks, a disk with a wear level exceeding a threshold wear level; and
selecting, from the one or more disk arrays, a disk array constructed based on at least the disk as the target disk array.

13. The apparatus of claim 11, wherein determining the target disk array comprises:
selecting, from the plurality of disks, a disk with an input/output load level exceeding a threshold load levels; and
selecting, from the one or more disk arrays, a disk array constructed based on at least the disk as the target disk array.

14. The apparatus of claim 12, wherein determining the first disk slice comprises:
determining, from the plurality of disk slices, a disk slice located on the disk as the first disk slice.

15. The apparatus of claim 11, wherein the first disk slice is located on a first disk of the plurality of disks, and allocating the second disk slice comprises:
selecting, from the plurality of disks, a second disk different from the first disk; and
allocating the second disk slice on the second disk.

16. The apparatus of claim 15, wherein the first disk has a first wear level, and selecting the second disk comprises:
selecting, from the plurality of disks, the second disk with a second wear level below the first wear level.

17. The apparatus of claim 15, wherein the first disk has a first input/output load level, and selecting the second disk comprises:
selecting, from the plurality of disks, a second disk with a second input/output load level below the first input/output load level.

18. The apparatus of claim 11, wherein migrating data from the first extent of the first disk slice into a corresponding position within the second disk slice comprises:
determining a first location of a first extent in the first disk slice;
determining, based on the first location, a second location in the second disk slice for storing data from the first extent; and
migrating the data from the first location in the first disk slice to the second location in the second disk slice.

19. The apparatus of claim 11, wherein the actions further comprise:
obtaining metadata of the target disk array, the metadata indicating that the target disk array is associated with the plurality of disk slices; and
in response to the second disk slice being allocated, updating the metadata to indicate that the target disk array is associated with the second disk slice.

20. The apparatus of claim 19, wherein the actions further comprise:
in response to completion of the reconstruction of the stripe, updating the metadata to indicate that the target disk array is disassociated from the first disk slice.

21. A computer program product having a non-transitory computer readable medium which stores a set of instructions to manage a disk array; the set of instructions, when carried out by computerized circuitry, causing the computerized circuitry to perform a method of:
  determining, from one or more disk arrays constructed based on a plurality of disks, a target disk array to be restriped, the target disk array being associated with a plurality of disk slices on different individual disks and including a stripe to be reconstructed, the stripe comprising a plurality of extents located in the plurality of disk slices, wherein each disk slice is located completely within a single one of the plurality of disks, and wherein each extent is located completely within a single one of the plurality of disk slices;
  determining, from the plurality of disk slices, a first disk slice on which data migration is to be performed, a first extent of the plurality of extents being located in the first disk slice;
  allocating, on the plurality of disks, a second disk slice for storing data from the first disk slice; and
  reconstructing the stripe by migrating data only from the first extent of the first disk slice into a corresponding position within the second disk slice, wherein migrating data from the first extent of the first disk slice into the corresponding position within the second disk slice completely reconstructs the stripe.

22. The method of claim 1, further comprising:
  dividing each disk in the plurality of disks in the one or more disk arrays into a plurality of slices, wherein the slices are each of the same fixed size; and
  wherein each one of the disk slices associated with the target disk array is located on a different disk; and
  wherein each one of the extents in the stripe to be reconstructed is located in a different one of the slices associated with the target disk array.

23. The method of claim 1, wherein the stripe to be restriped is one of a plurality of stripes that are used by a user.

24. The method of claim 23, further comprising:
  restriping each one of the plurality of stripes that are used by the user; and
  responsive all of the stripes that are used by the user having been restriped, releasing the storage space occupied by the first disk slice in the first disk and disabling the first disk.

* * * * *